United States Patent
Hautala

(10) Patent No.: US 8,378,982 B2
(45) Date of Patent: Feb. 19, 2013

(54) OVERLAY HANDLING

(75) Inventor: Teemu Tapani Hautala, Tampere (FI)

(73) Assignee: Nokia Corporation, Espoo (FI)

( * ) Notice: Subject to any disclaimer, the term of this patent is extended or adjusted under 35 U.S.C. 154(b) by 475 days.

(21) Appl. No.: 12/645,999

(22) Filed: Dec. 23, 2009

(65) Prior Publication Data

US 2011/0148776 A1    Jun. 23, 2011

(51) Int. Cl.
*G06F 3/041* (2006.01)
*G06F 3/048* (2006.01)

(52) U.S. Cl. .................. 345/173; 715/808; 715/809

(58) Field of Classification Search .............. 345/173; 715/808

See application file for complete search history.

(56) References Cited

U.S. PATENT DOCUMENTS

| | | | |
|---|---|---|---|
| 2006/0010397 A1* | 1/2006 | Laffey | 715/808 |
| 2006/0209016 A1* | 9/2006 | Fox et al. | 345/156 |
| 2006/0224994 A1 | 10/2006 | Cheemalapati et al. | 715/808 |
| 2009/0177981 A1* | 7/2009 | Christie et al. | 715/758 |
| 2009/0204927 A1* | 8/2009 | Terasaki | 715/781 |
| 2009/0219252 A1* | 9/2009 | Jarventie et al. | 345/173 |

FOREIGN PATENT DOCUMENTS

| | | |
|---|---|---|
| EP | 2128742 A2 | 12/2009 |
| KR | 20100093689 A | 8/2010 |
| WO | WO-2009031214 A1 | 3/2009 |

OTHER PUBLICATIONS

International Search Report for corresponding International Patent Application No. PCT/IB2010/055669 mailed May 6, 2011.

* cited by examiner

*Primary Examiner* — Joseph Haley
*Assistant Examiner* — Nicholas Lee
(74) *Attorney, Agent, or Firm* — Harrington & Smith

(57) ABSTRACT

A method includes determining that an overlay is to be displayed at a predetermined area on a touch-sensitive display, the overlay being operable to be closed in response to a user providing a touch input at predetermined location within the predetermined area of the overlay; detecting the presence of a digit proximate to a surface of the touch-sensitive display; determining a digit location, the digit location being a location on the surface of the touch-sensitive display to which the digit is proximate; comparing the digit location with the predetermined location; and if the digit location corresponds to the predetermined location, modifying the operation of the overlay so as to prevent closure of the overlay in response to a touch input provided at the predetermined location.

19 Claims, 11 Drawing Sheets

OVERLAY HANDLING

FIELD

The present invention relates to methods, non-transitory memory mediums and electronic device for handling overlays that are to be displayed on a display.

BACKGROUND

User interfaces such as touchscreens have become commonplace since the emergence of the electronic touch interface. Touchscreens have become familiar in retail settings, on point of sale systems, on smart phones, on automated teller machines (ATMs), and on personal digital assistants (PDAs). The popularity of smart phones, PDAs, and other types of handheld electronic device has resulted in an increased demand for touchscreens.

SUMMARY

A first aspect of this specification describes a method comprising: determining that an overlay is to be displayed at a predetermined area on a touch-sensitive display, the overlay being operable to be closed in response to a user providing a touch input at predetermined location within the predetermined area of the overlay; detecting the presence of a digit proximate to a surface of the touch-sensitive display; determining a digit location, the digit location being a location on the surface of the touch-sensitive display to which the digit is proximate; comparing the digit location with the predetermined location; and if the digit location corresponds to the predetermined location, modifying the operation of the overlay so as to prevent closure of the overlay in response to a touch input provided at the predetermined location.

A second aspect of this specification describes a non-transitory computer-readable storage medium having stored thereon computer-readable code, which, when executed by computing apparatus, causes the computer apparatus: to determine that an overlay is to be displayed at a predetermined area on a touch-sensitive display, the overlay being operable to be closed in response to a user providing a touch input at a predetermined location within the predetermined area of the overlay; to detect the presence of a digit proximate to a surface of the touch-sensitive display; to determine a digit location, the digit location being a location on the surface of the touch-sensitive display to which the digit is proximate; to compare the digit location with the predetermined location; and if the digit location corresponds to the predetermined location, to modify the operation of the overlay so as to prevent closure of the overlay in response to a touch input provided at the predetermined location.

A third aspect of this specification describes An electronic device comprising at least one processor configured, under the control of machine-readable code: to determine that an overlay is to be displayed at a predetermined area on a touch-sensitive display, the overlay being operable to be closed in response to a user providing a touch input at a predetermined location within the predetermined area of the overlay; to detect the presence of a digit proximate to a surface of the touch-sensitive display; to determine a digit location, the digit location being a location on the surface of the touch-sensitive display to which the digit is proximate; to compare the digit location with the predetermined location; and if the digit location corresponds to the predetermined location, to modify the operation of the overlay so as to prevent closure of the overlay in response to a touch input provided at the predetermined location.

This specification also describes apparatus comprising: means for determining that an overlay is to be displayed at a predetermined area on a touch-sensitive display, the overlay being operable to be closed in response to a user providing a touch input at predetermined location within the predetermined area of the overlay; means for detecting the presence of a digit proximate to a surface of the touch-sensitive display; means for determining a digit location, the digit location being a location on the surface of the touch-sensitive display to which the digit is proximate; comparing the digit location with the predetermined location; and if the digit location corresponds to the predetermined location, means for modifying the operation of the overlay so as to prevent closure of the overlay in response to a touch input provided at the predetermined location.

The methods described herein may be caused to be performed by computing apparatus executing computer-readable code.

The term "digit" is intended to include within its scope, a finger, a thumb, a stylus or any other member for applying a touch input to a touch sensitive panel.

The terms "proximate to" and "near to" are intended to include also "in contact with".

BRIEF DESCRIPTION OF THE DRAWINGS

For a more complete understanding of exemplary embodiments of the present invention, reference is now made to the following description taken in connection with the accompanying drawings in which.

DETAILED DESCRIPTION OF THE DRAWINGS

Figure 1:
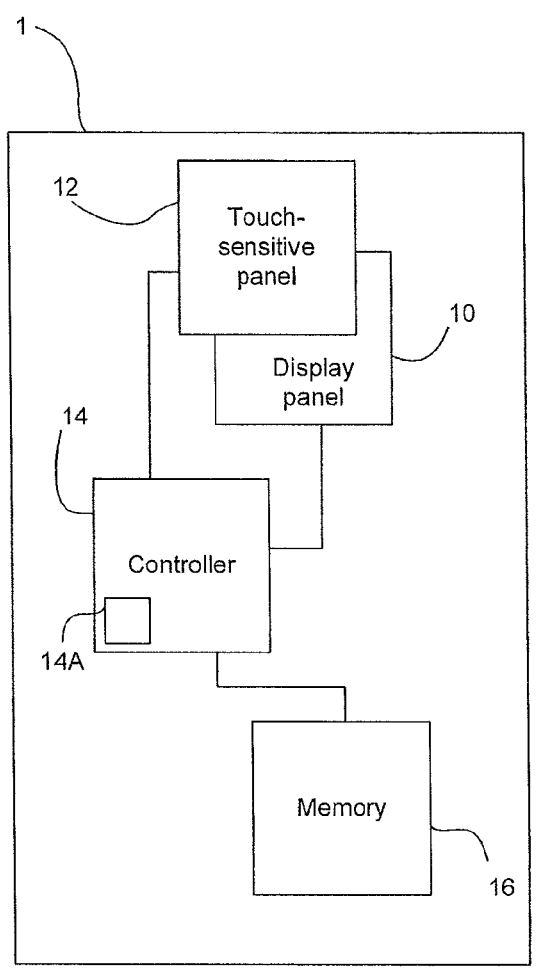
FIG. 1 is a schematic block diagram of apparatus according to exemplary embodiments of the present invention.

In the description and drawings, like reference numerals refer to like elements throughout.

FIG. 1 is a schematic block diagram of apparatus 1 according to exemplary embodiments of the present invention. The apparatus 1 comprises a display panel 10 overlaid by a touch-sensitive panel 12 to form a touchscreen 10, 12. The display panel 10 may be of any suitable type. For example, the display panel 10 may comprise an OLED display, an LCD display, an e-ink display, or other.

The touch-sensitive panel 12 is operable to detect the presence of a finger, thumb, or stylus proximate to or near to the surface of the touch-sensitive panel 12. Suitable types of touch-sensitive panel 12 include projected capacitance touch-sensitive panels. The operation of such touch-sensitive panels is well known in the art, and so a detailed explanation thereof is not provided. According to some exemplary embodiments, it may be determined that a finger, thumb, or stylus is proximate to the surface of the touch-sensitive panel, based on a magnitude of a change in a signal received from the touch-sensitive panel 12 as the finger thumb or stylus is brought near to the surface. Thus, the signal when a finger is not proximate to the surface may be compared with the signal received as a finger is brought close to the surface. When signal is detected to have changed by a predetermined amount, it may be determined that the finger is proximate to the surface. In the example of projected capacitive touch-sensitive panels, the magnitude of the signal received may be dependent on, for example, one or more of: the distance of the finger, thumb or stylus from the surface of the panel; the size of the finger, thumb, the temperature and the properties of the touch sensitive panel. It will be appreciated that other types of touch-sensitive panels, for example infrared touch-sensitive panels, may also be suitable.

The apparatus 1 also comprises a controller 14. The controller 14 is configured to provide signals for controlling the output of the display panel 10. The controller 14 is configured also to receive signals from the touch-sensitive panel 12 indicating the presence of a finger or stylus in contact with or near to the surface of the touch-sensitive panel 12. The controller 14 is configured also to control other components of the apparatus 1, including the display panel 10, based on the signals received from the touch-sensitive panel 12.

The controller 14 may comprise one or more processors or microprocessors 14A operating under the control of computer readable code stored on a non-transitory memory medium 16, such as RAM or ROM. The controller 14 may in addition comprise one or more application-specific integrated circuits (ASICs).

Figure 2B:
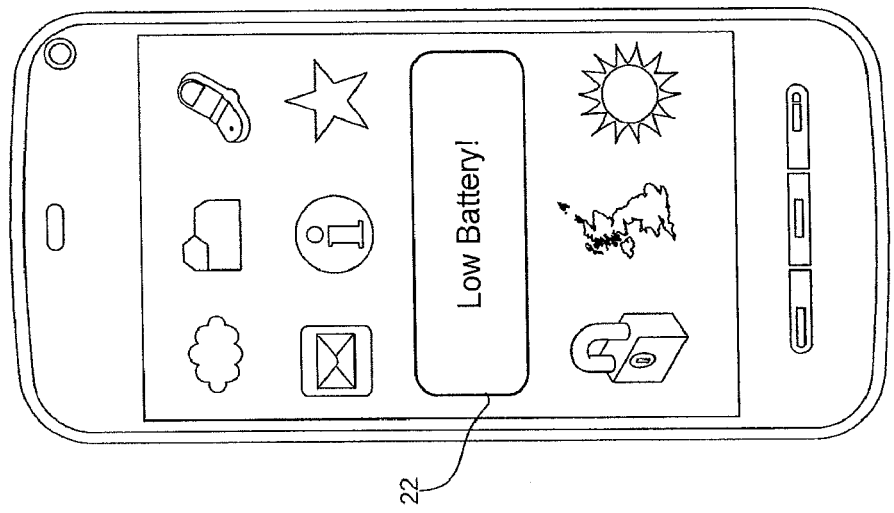
FIG. 2 is an electronic device comprising the apparatus of the example of FIG. 1.
Figure 2A:
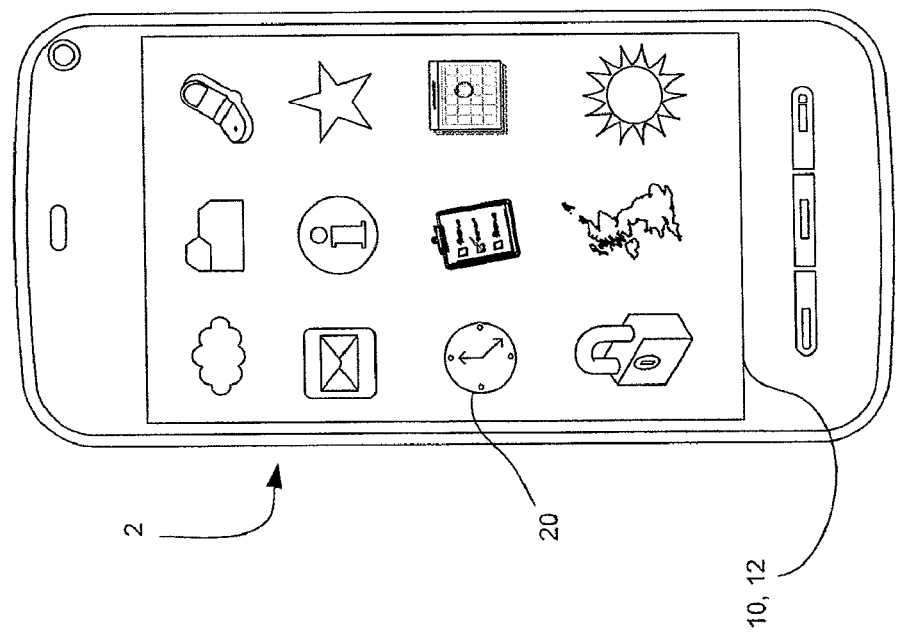

FIGS. 2A and 2B show an electronic device 2 according to exemplary embodiments of the present invention. The electronic device 2 comprises the apparatus of the example of FIG. 1. In this example, the electronic device 2 is a mobile phone. According to alternative embodiments, the electronic device may be a touchscreen device of another type, for example a personal digital assistant (PDA), a touchscreen laptop, or a positioning device (e.g. a GPS module).

The controller 14 (not visible in FIGS. 2A and 2B) is operable to cause selectable icons and images to be displayed on the touchscreen. Each of the icons has an action associated with it. The controller 14 is configured to be responsive to signals received from the touch-sensitive panel 12 indicating that a touch input has been received at a location corresponding to a location of one to the selectable icons to cause an action associated with the selected icon to be performed.

In the example of FIGS. 2A and 2B, an array of selectable icons 20 is displayed on the touchscreen 10, 12. The array may constitute, for example, a menu for allowing users to select for execution by the controller 14 applications stored on the memory medium 16 (not visible in FIGS. 2A and 2B).

The controller 14 is operable also to cause a dialogue box 22 to be displayed at a predetermined area on the touch screen 10, 12. The controller 14 is operable to cause the dialogue box 22 to be overlaid on top of the images or icons that are currently being displayed on the touchscreen 10, 12. Thus, the dialogue box 22 may be termed "an overlay".

The predetermined area at which the dialogue box 22 is displayed may be termed an "overlay area". An exemplary dialogue box 22 can be seen in FIG. 2B. The dialogue box 22 may include information of importance to the user. In FIG. 2B, the dialogue box 22 indicates that the battery (not shown) of the electronic device 2 is low in charge. It will be understood that other messages may instead be displayed. In the example of FIG. 2B, the overlay area on which the dialogue box is displayed is in a central region of the touchscreen 10, 12. It will be appreciated that, according to alternative embodiments, the overlay area may be at different on the touchscreen 10, 12, for example a top region or a bottom region.

The controller 14 is operable to cause the dialogue box 22 to be closed or shut down, in response to receiving signals from the touchscreen 10, 12 indicating that a touch input has been received at a predetermined location within the overlay area. As such, once a user has read the message displayed on the dialogue box 22, they can cause the dialogue box 22 to be closed by providing a touch input at the predetermined location.

According to some exemplary embodiments, the dialogue box 22 may be closable in response to a touch input received at any location within the entire overlay area 22. In other embodiments, the dialogue box 22 may be caused to be closed in response to receiving a touch input at any location within a selectable sub-area (not shown) of the overlay area. The sub-area may correspond to, for example an "OK" or "Cancel" button. In other embodiments, the dialogue box 22 may be caused to be closed in response to receiving a touch input at any location within a plurality of selectable sub-areas provided within the overlay area. Each of the plurality of sub-areas may correspond to a different selectable option to the user, for example "Yes" and "No".

The exemplary embodiments described below are described primarily within a context wherein the controller 14 causes the dialogue box 22 to be closed in response to a received touch input at any location within the entire overlay area.

Figure 3A:
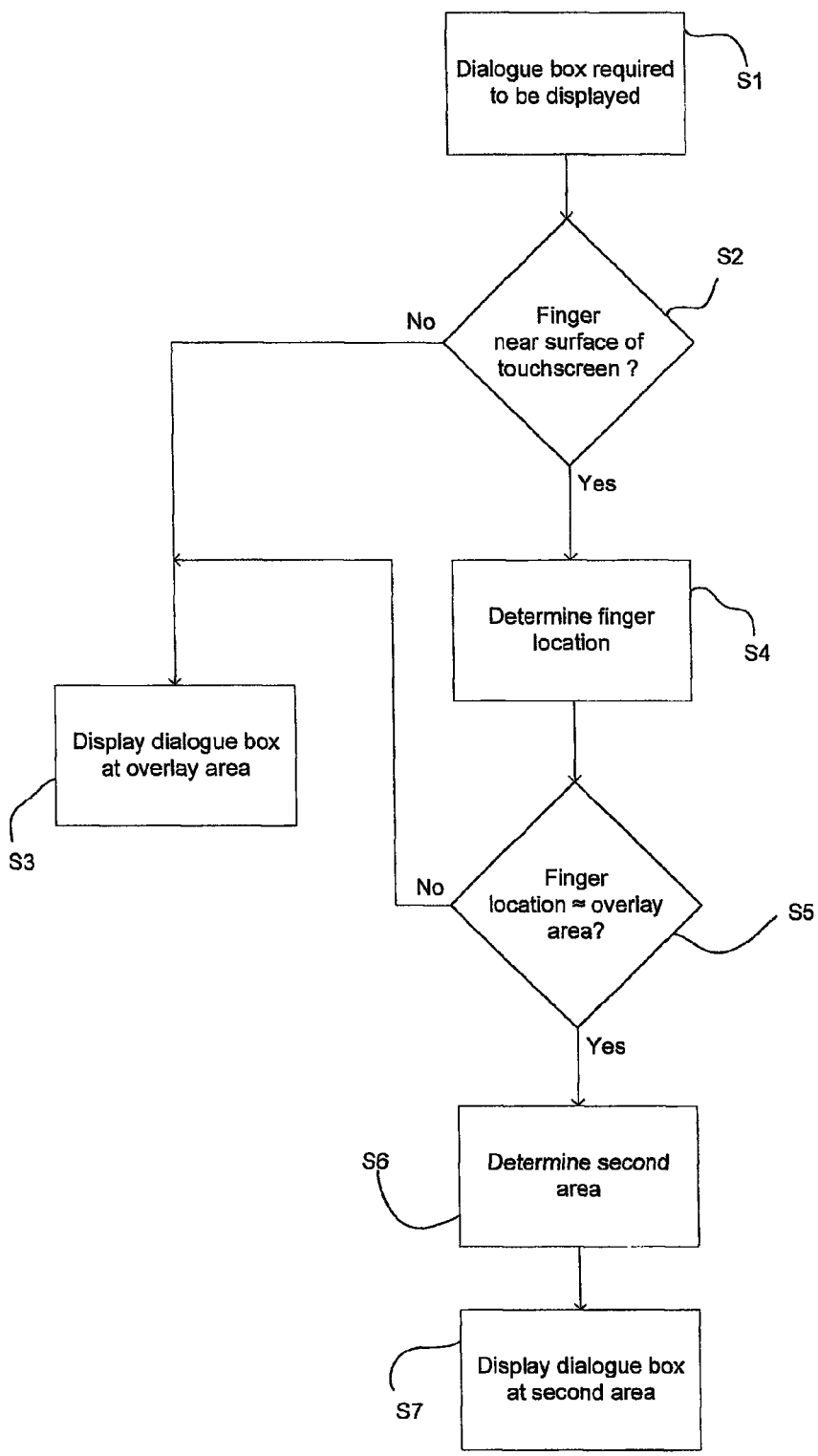
FIG. 3A is a flow chart illustrating an operation according to a first exemplary embodiment of the invention.

A first exemplary embodiment of the invention will now be described with reference to the example of FIG. 3 and FIGS. 4A, 4B and 4C. FIG. 3 is a flow chart illustrating an operation according to the first exemplary embodiment of the invention. FIGS. 4A to 4C show the electronic device 2 of the example of FIG. 2 at various stages throughout the operation described with reference to the example of FIG. 3.

In FIG. 4A a user is in the process of using their finger 41 to provide a touch input so as to select one of the icons 20 displayed on the touchscreen 10, 12. Prior to the user actually applying a touch input, the controller 14, in step S1 of FIG. 3, determines that a dialogue box is to be displayed at the overlay area. The overlay area 40 at which the dialogue box is to be displayed is depicted in FIG. 4B by the rectangular box having a dashed perimeter.

Next, in step S2, the controller 14 determines, based on signals received from the touch-sensitive panel 12, if a finger 41 is proximate to the surface of the touchscreen 10, 12. If it is determined that a finger 41 is not proximate to the surface of the touchscreen 10, 12, the operation proceeds to step S3.

In step S3, the dialogue box 22 is displayed in an unmodified manner at the area 40 of the touch screen 10, 12.

If, however, it is determined in step S2, that a finger 41 is present near the surface of the touchscreen 10, 12 (as is the case in FIG. 4B due to the using being in the process of selecting an icon 20), the operation proceeds to step S4.

In step S4, the controller 14 determines, based on signals received from the touch-sensitive panel 12, a location on the touchscreen 10, 12 to which the finger 41 is most proximate. This location may be termed the "finger location". The finger location may comprise a single point or alternatively may comprise an area. In the example of FIG. 4B, the finger location 42 comprises an area and is depicted by a circle 42 having a dashed perimeter. The area may be defined by a central location and a radius, for instance.

Next in step S5, the controller determines if the finger location 42 corresponds to the overlay area 40 at which the dialogue box 22 is required to be displayed. The finger location 42 and the overlay area 40 may be determined to correspond if the finger location 42 is entirely within, or, when the finger location 42 is itself an area (as is the case in FIG. 4B), is overlapping with the overlay area 40. According to some exemplary embodiments, the finger location 42 and the overlay area 40 also may be determined to be corresponding if the finger location 42 is entirely outside, but near to (for example within 5 mm of) the overlay area 40.

It will be understood that, according to alternative embodiments wherein the dialogue box 22 comprises one or more selectable sub-areas, step S5 may instead comprise determining if the finger location 42 corresponds to one of the one or more selectable sub-areas provided within the overlay area 40. The finger location 42 and the one of the one or more selectable sub-areas provided within the overlay area 40 may be determined to correspond if the finger location 42 is entirely within, or, when the finger location 42 is itself an area (as is the case in FIG. 4B), is overlapping with the one of the one or more sub-areas. According to some exemplary embodiments, the finger location 42 and the one of the one or more sub-areas also may be determined to be corresponding if the finger location 42 is entirely outside, but near to (for example within 5 mm of) the sub-area 40.

If, in step S5, it is determined that the finger location 42 does correspond to the overlay area 40 (as is the case in FIG. 4B), the operation proceeds to step S6.

In step S6, the controller 14 determines a second area, the second area being an area on the touchscreen 10, 12 that does not correspond to the finger location 42.

Next in step S7, the controller 14 causes the dialogue box 22 is displayed at the second location. FIG. 4C shows the dialogue box 22 being displayed at the second location.

If, in step S5, it is determined that the finger location 42 does not correspond to the overlay area 40 of the dialogue box 22, the operation proceeds to step S3, in which the dialogue box 22 is displayed at the overlay area 40 of the touchscreen 10, 12.

According to some exemplary embodiments, the dialogue box 22 is displayed initially at the overlay area 40 for a short period, for example less than 1 second. During this short period, the controller 14 disables the operability of the dialogue box 22 to be closed in response to a received touch input. Next, following expiry of the short period, an animation showing the dialogue box 22 being moved from the overlay area 40 to the second area is displayed on the touchscreen 10, 12. This may appear to the user as if the dialogue box 22 is escaping the user's finger, and may improve the overall user experience. When the dialogue box 22 arrives at the second area, the controller re-enables the operability of the dialogue box 22 to be closed in response to a received touch input.

According to some exemplary embodiments, the second area may be a pre-determined area. For example, the second area may be an area next to the predetermined area. Alternatively, the second area may be selected from a plurality of different overlay areas. The selection as to on which of the plural overlay areas the dialogue box should be displayed may be made on the basis of whether the overlay areas are overlapping with any images, icons or text currently being displayed on the display panel. The plurality of overlay areas may be prioritized. As such, if an overlay area having the highest priority is unavailable because, for example, it corresponds to an area in which images are being displayed, the controller 14 instead selects the overlay area having the second highest priority, if that area is itself available.

The above described operations result in the user being prevented from accidently closing a dialogue box 22 when attempting to provide a touch input for a purpose other than to close the dialogue box 22, for example, such as to select an icon from a menu, or to provide a response to, or to shut down, a dialogue box that is already being displayed on the touchscreen 10, 12. This is achieved by moving the dialogue box to a position away from the digit.

Figure 3B:
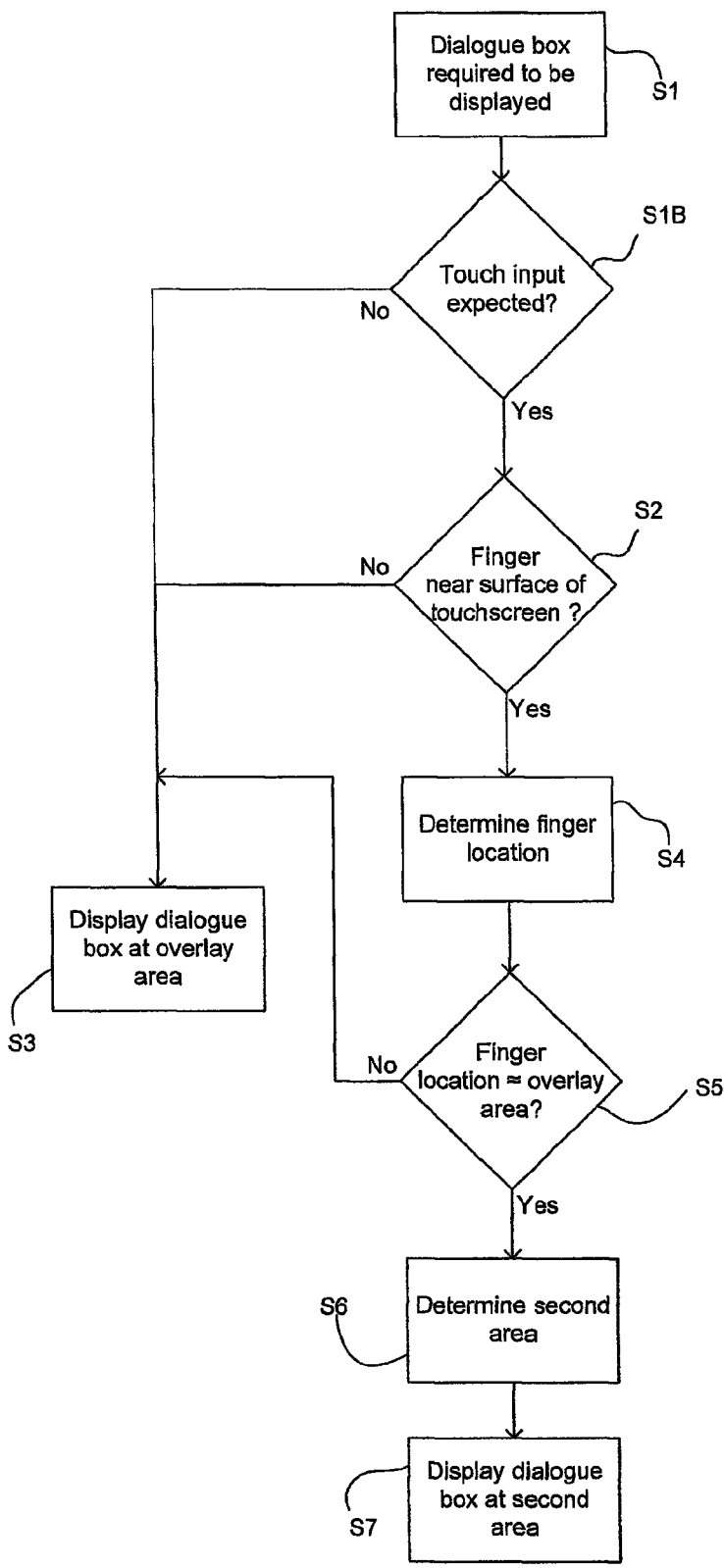
FIG. 3B is a flow chart illustrating an alternative operation according to the first exemplary embodiment of the invention.
Figure 4C:
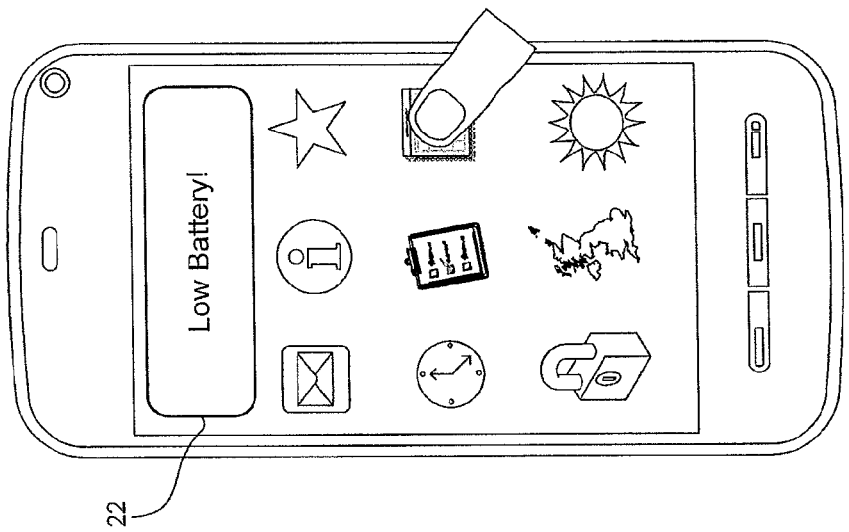
FIGS. 4A to 4C show the electronic device of the example of FIG. 2 at various stages throughout the operations described with reference to the examples of FIGS. 3A and 3B.
Figure 4B:
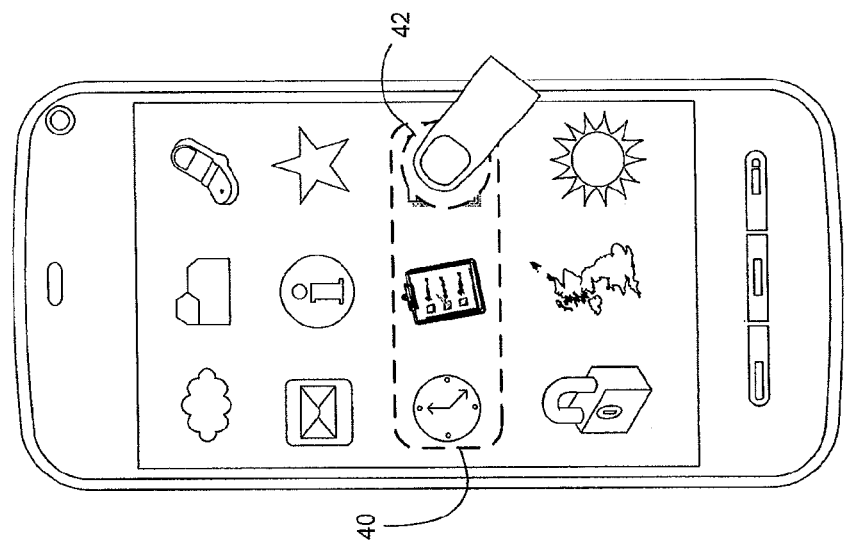
Figure 4A:
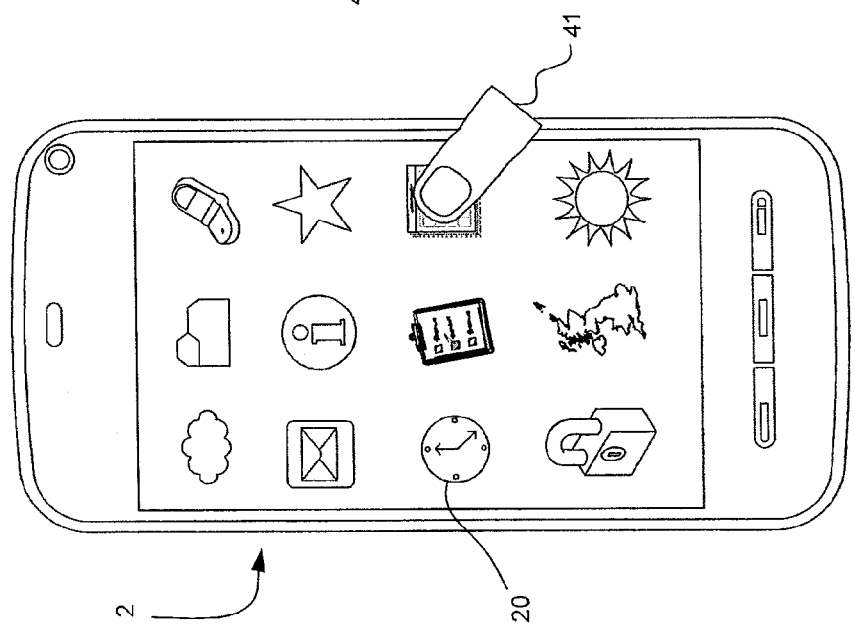

According to some alternative exemplary embodiments, the apparatus of FIG. 1 may perform an operation as depicted in FIG. 3B. The exemplary operation of FIG. 3B differs from that in FIG. 3A in that it includes an additional step, S1B, between steps S1 and S2. Step S1B comprises the controller 14 determining whether it is expected that a touch input will be received soon. This may comprise determining, based on applications being executed by the device 2, whether the user is currently performing a task that is not yet completed. The task may include, for example, text or number entry. Thus, if a keyboard or keypad is currently being displayed on the display to allow text or number entry, the controller 14 may determine that another touch input is expected to be received. Other such tasks include an installation-, or other type of, wizard being executed on the device. If it is determined in step S1B that a touch input is expected to be received soon, the operation proceeds to step S2. If, instead, it is determined that a touch input is not expected to be received soon, the operation proceeds to step S3.

Figure 5A:
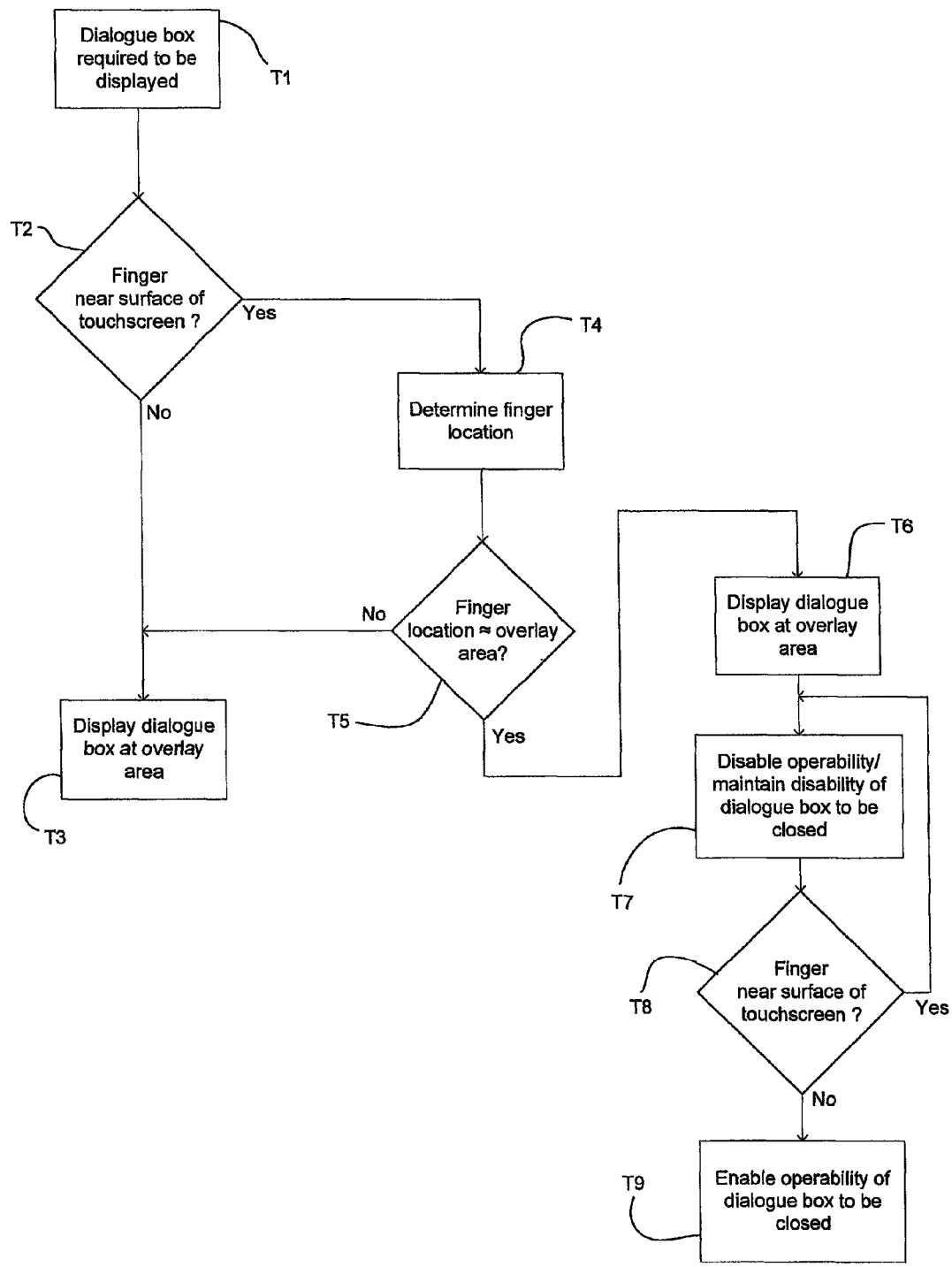
FIG. 5A is a flow chart illustrating an operation according to a second exemplary embodiment of the invention.

A second exemplary embodiment of the invention will now be described with reference to FIG. 5 and FIGS. 6A, 6B and 6C. The example of FIG. 5 is a flow chart illustrating an operation according to the second exemplary embodiment of the invention. The examples of FIGS. 6A to 6C show the electronic device of the example of FIGS. 2A and 2B at various stages throughout the operation described with reference to the example of FIG. 5.

Figure 5B:
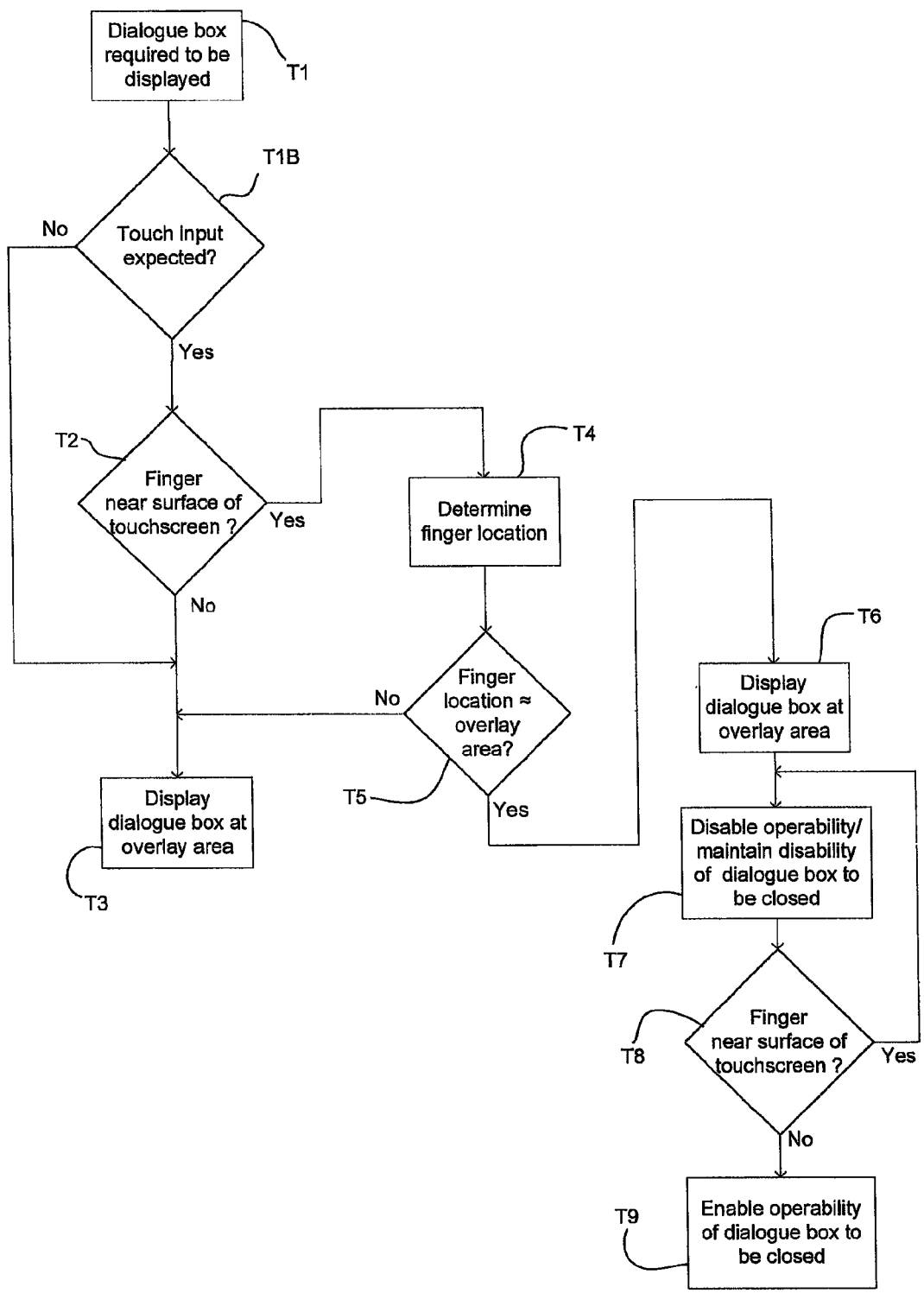
FIG. 5B is a flow chart illustrating an alternative operation according to a second exemplary embodiment of the invention.
Figure 6C:
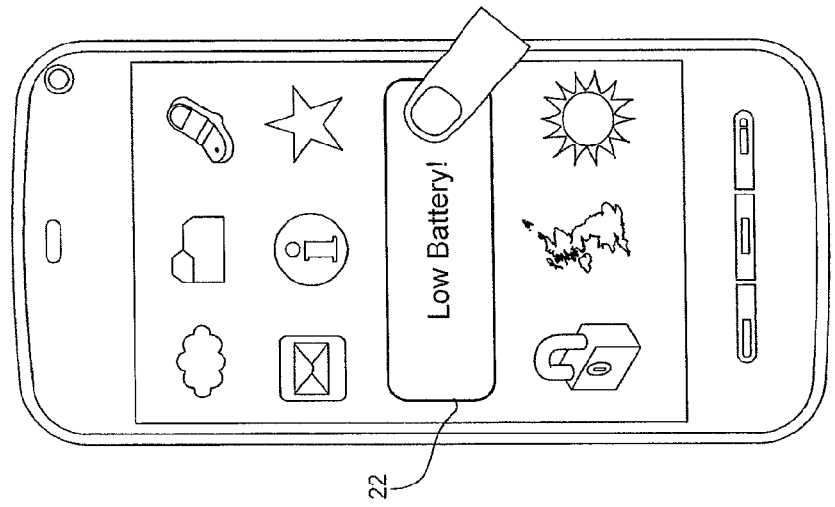
FIGS. 6A to 6C show the electronic device of the example of FIG. 2 at various stages throughout the operations described with reference to the examples of FIGS. 5A and 5B.
Figure 6B:
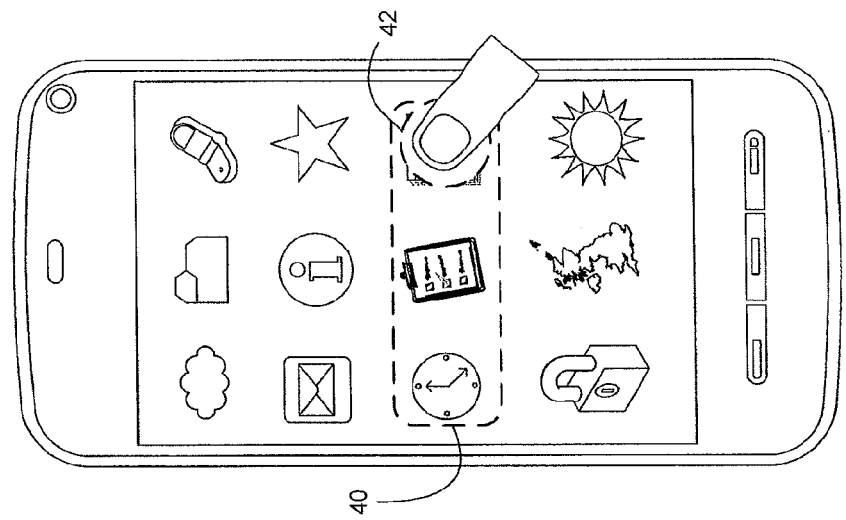
Figure 6A:
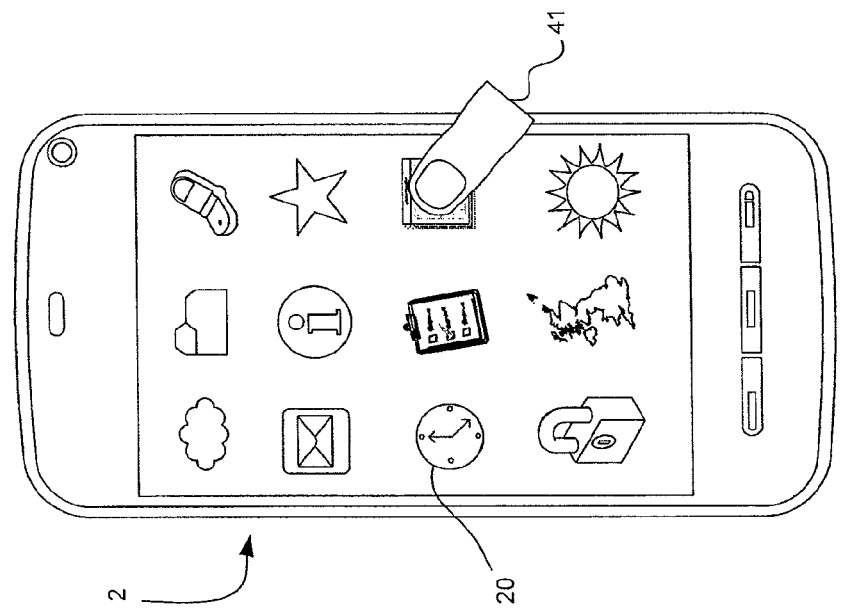

In FIG. 6A, a user is in the process of using their finger 41 to provide a touch input so as to select one of the icons 20 displayed on the touchscreen 10, 12. Prior to the user actually applying a touch input, the controller 14, in step T1 of FIG. 5, determines that a dialogue box 22 is to be displayed at the overlay area 40. The overlay area 40 of the touchscreen 10, 12 at which the dialogue box 22 is required to be displayed is depicted in FIG. 6B by the rectangular box having a dashed perimeter.

In step T2, the controller 14 determines, based on signals received from the touch-sensitive panel 12, if a finger 41 is proximate to the surface of the touchscreen 10, 12. If it is determined that a finger 41 is not proximate to the surface of the touchscreen 10, 12, the operation proceeds to step T3.

In step T3, the dialogue box 22 is displayed in an unmodified manner at the overlay area 40.

If, however, it is determined in step T2, that a finger 41 is present near the surface of the touchscreen 10, 12 (as is the case in FIG. 6B due to the using being in the process of selecting an icon 20), the operation proceeds to step T4.

In step T4, the controller 14 determines, based on signals received from the touch-sensitive panel 12, a location on the touchscreen 10, 12 to which the finger 41 is most proximate. This location may be termed the "finger location". The finger location may comprise a single point or alternatively may comprise an area. In FIG. 6B, the finger location 42 comprises an area and is depicted by a circle 42 having a dashed perimeter. The area may be defined by a central location and a radius, for instance.

Next in step T5, the controller determines if the finger location 42 corresponds to the overlay area 40 at which the dialogue box 22 is required to be displayed. The finger location 42 and the overlay area 40 may be determined to correspond if the finger location 42 is entirely within, or, when the finger location 42 is itself an area (as is the case in FIG. 6B), is overlapping with the overlay area 40. According to some exemplary embodiments, the finger location 42 and the overlay area 40 also may be determined to be corresponding if the finger location 42 is entirely outside, but near to (for example within 5 mm of one another) the overlay area 40.

It will be understood that, according to alternative embodiments wherein the dialogue box 22 comprises one or more selectable sub-areas, step T5 may instead comprise determining if the finger location 42 corresponds with one of the one or more selectable sub-areas provided within the overlay 22. The finger location 42 and the one of the one or more selectable sub-areas provided within the overlay area 40 may be determined to correspond if the finger location 42 is entirely within, or, when the finger location 42 is itself an area (as is the case in FIG. 4B), is overlapping with the one of the one or more sub-areas. According to some exemplary embodiments, the finger location 42 and the one of the one or more sub-areas also may be determined to be corresponding if the finger location 42 is entirely outside, but near to (for example within 5 mm of) the sub-area 40.

If, in step T5, it is determined that the finger location 42 does correspond to the overlay area 40 (as is the case in the example of FIG. 4B), the operation proceeds to steps T6 and T7.

In step T6, the controller 14 causes the dialogue box 22 to be displayed at the overlay area 40. Substantially simultaneously with step T6, in step T7, the controller 14 disables the operability of the dialogue box 22 to be closed or shut down in response to a received touch input. Thus, a touch input within the overlay area 40 (or sub-area if applicable) of the dialogue box 22 does not cause the dialogue box 22 to be closed.

Next, the operation proceeds to step T8. In step T8, the controller 14 determines, based on signals received from the touchscreen 10, 12, if the finger 41 is still near to the surface of the touchscreen 10, 12.

If, in step T8, it is determined that the finger 41 is still near to the surface of the touchscreen 10, 12, the operation returns to step T7, in which the controller 14 maintains the disability of the dialogue box 22 to be closed in response to a received touch input. FIG. 6C shows the dialogue box 22 being displayed at the overlay area 40, but having its responsiveness to a touch input to be shut down temporarily disabled.

If, in step T8, it is determined that the finger 41 is no longer near to the surface of the touchscreen 10, 12, the operation proceeds to step T9. In step T9, the controller 14 re-enables the operability of the dialogue box 22 to be closed in response to a received touch input.

If, in step T5, it is determined that the finger location 42 does not correspond to the overlay area 40 of the dialogue box 22, the operation proceeds to step T3, in which the dialogue box 22 is displayed at the overlay area 40 of the touchscreen 10, 12.

The exemplary operations described with reference to FIGS. 5 and 6A to 6C prevent the user from accidently closing a dialogue box 22 when attempting to provide a touch input for a purpose other than to close the dialogue box 22, for example, such as to select an icon from a menu, or to provide a response to, or to shut down, a dialogue box that is already being displayed on the touchscreen 10, 12. This is achieved by preventing the dialogue box being closable until the digit is removed from near the touchscreen.

According to some alternative exemplary embodiments, the apparatus of FIG. 1 may perform an operation as depicted in FIG. 5B. The exemplary operation of FIG. 5B differs from that in FIG. 5A in that it includes an additional step S1B between steps T1 and T2. Step T1B comprises the controller 14 determining whether it is expected that a touch input will be received soon. This may comprise determining, based on applications being executed by the device 2, whether the user is currently performing a task that is not yet completed. The task may include, for example, text or number entry. Thus, if a keyboard or keypad is currently being displayed on the display to allow text or number entry, the controller 14 may determine that another touch input is likely to be received. Other such tasks include, for example, an installation, or other type of, wizard being executed on the device. If it is determined in step T1B that a touch input is expected to be received soon, the operation proceeds to step T2. If, instead, it is determined that a touch input is not expected to be received soon, the operation proceeds to step T3.

Figure 7:
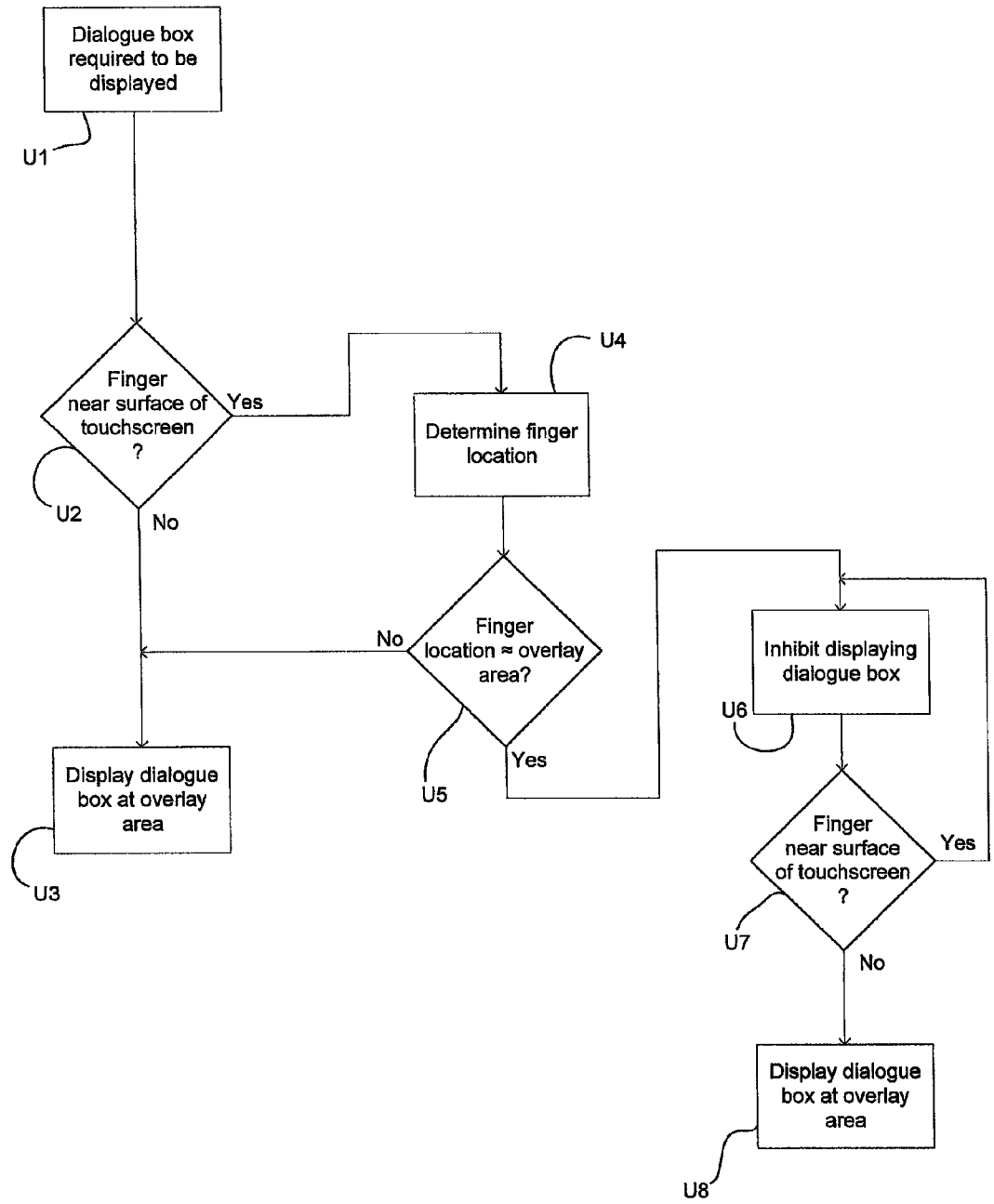
FIG. 7 is a flow chart illustrating an operation according to the third exemplary embodiment of the invention.
Figure 8C:
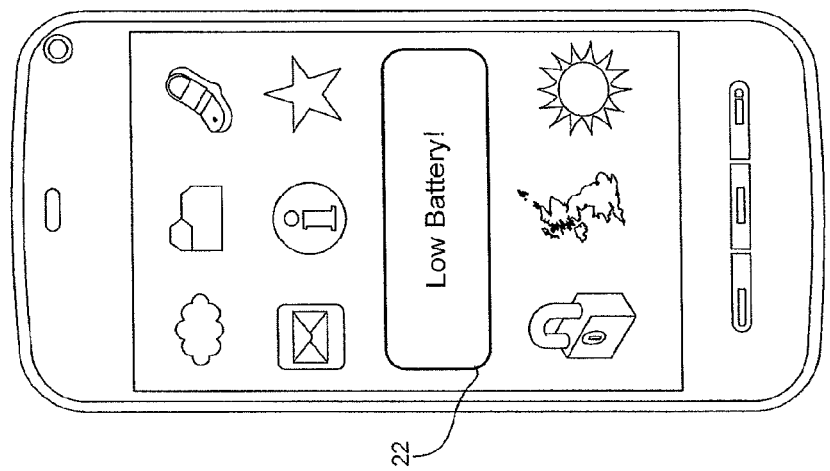
FIGS. 8A to 8C show the electronic device of FIG. 2 at various stages throughout the operations described with reference to the examples of FIGS. 7 and 7B.
Figure 8B:
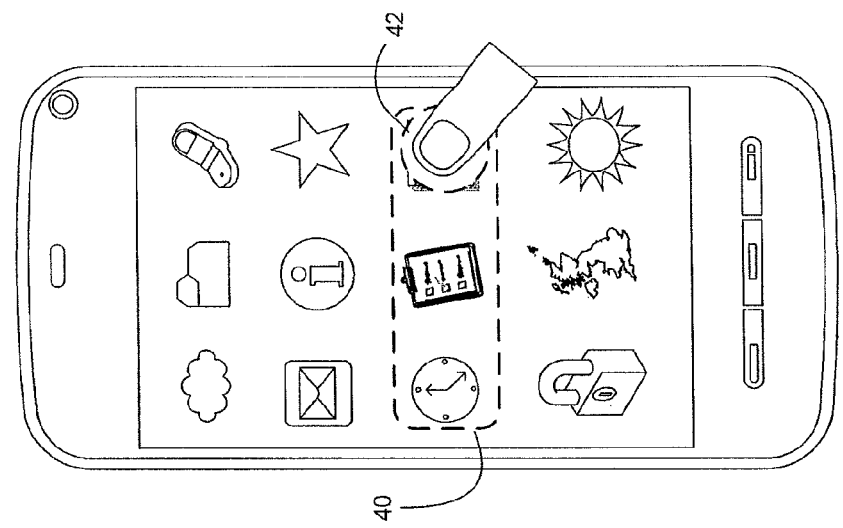
Figure 8A:
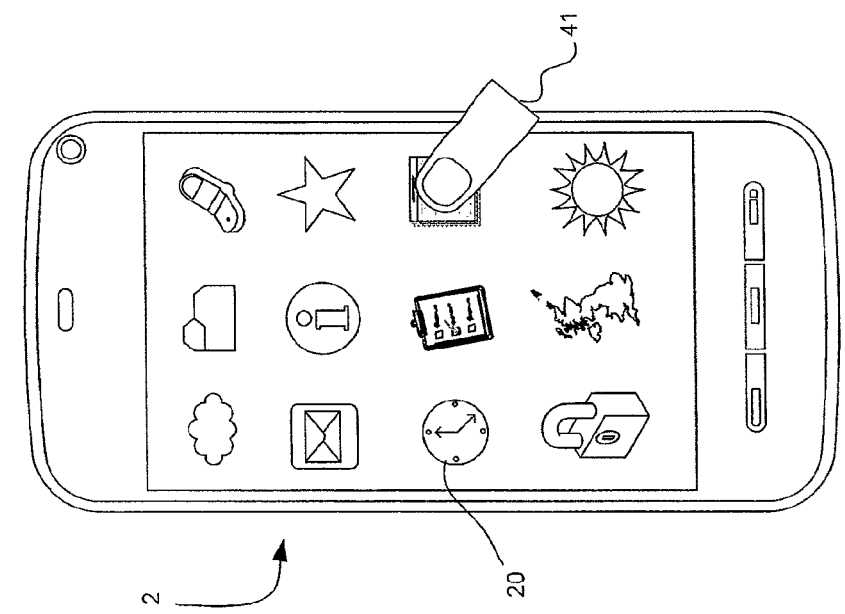

A third exemplary embodiment of the invention will now be described with reference to FIG. 7 and FIGS. 8A, 8B and 8C. The example of FIG. 7 is a flow chart illustrating an operation according to the third exemplary embodiment of the invention. FIGS. 8A to 8C show the electronic device of FIGS. 2A and 2B at various stages throughout the operation described with reference to FIG. 7.

In FIG. 8A a user is in the process of using their finger 41 to provide a touch input so as to select one of the icons 20 displayed on the touchscreen 10, 12. Prior to the user actually applying a touch input, the controller 14, in step U1 of FIG. 7, determines that a dialogue box 22 is to be displayed at the overlay area 40. The overlay area 40 of the touchscreen 10, 12 at which the dialogue box 22 is to be displayed is depicted in FIG. 8B by the rectangular box 40 having a dashed perimeter.

In step U2, the controller 14 determines, based on signals received from the touch-sensitive panel 12, if a finger 41 is proximate to the surface of the touchscreen 10, 12. If it is determined that a finger 41 is not proximate to the surface of the touchscreen 10, 12, the operation proceeds to step U3.

In step U3, the dialogue box 22 is displayed in an unmodified manner at the overlay area 40.

If, however, it is determined in step U2, that a finger 41 is present near the surface of the touchscreen 10, 12 (as is the case in FIG. 8B due to the using being in the process of selecting an icon 20), the operation proceeds to step U4.

In step U4, the controller 14 determines, based on signals received from the touch-sensitive panel 12, a location on the touchscreen 10, 12 to which the finger 41 is most proximate. This location may be termed the "finger location". The finger location may comprise a single point or alternatively may comprise an area. In FIG. 8B, the finger location 42 comprises an area and is depicted by a circle 42 having a dashed perimeter. The area may be defined by a central location and a radius, for instance.

Next in step U5, the controller determines if the finger location 42 corresponds to the overlay area 40 at which the dialogue box 22 is to be displayed. The finger location 42 and the overlay area 40 may be determined to correspond if the finger location 42 is entirely within, or, when the finger location 42 itself is an area (as is the case in FIG. 8B), is overlapping with the overlay area 40. According to some exemplary embodiments, the finger location 42 and the overlay area 40 also may be determined to be corresponding if the finger location 42 is entirely outside, but near to (for example within 5 mm of) the overlay area 40.

It will be understood that, according to alternative embodiments wherein the dialogue box 22 comprises one or more selectable sub-areas, step T5 may instead comprise determining if the finger location 42 corresponds with one of the one or more selectable sub-areas provided within the overlay area 40. The finger location 42 and the one of the one or more selectable sub-areas provided within the overlay area 40 may be determined to correspond if the finger location 42 is entirely within, or, when the finger location 42 is itself an area (as is the case in FIG. 4B), is overlapping with the one of the one or more sub-areas. According to some exemplary embodiments, the finger location 42 and the one of the one or more sub-areas also may be determined to be corresponding if the finger location 42 is entirely outside, but near to (for example within 5 mm of) the sub-area 40.

If, in step U5, it is determined that the finger location 42 does correspond to the overlay area 40 (as is the case in FIG. 8B), the operation proceeds to step U6. In step U6, the act of displaying the dialogue box 22 is inhibited.

Next, the operation proceeds to step U7. In step U7, it is determined whether the finger 41 is still near to the surface of the touchscreen 10, 12.

If in step U7, it is determined that the finger 41 is still near to the surface of the touchscreen 10, 12, the operation returns to step U6, in which the controller 14 continues to inhibit the act of displaying the dialogue box 22.

According to alternative exemplary embodiments, there may be a time limit on the duration for which the act of displaying a dialogue box 22 can be inhibited. For example, some types of dialogue box, for example those including critical error messages, may be such that they cannot be inhibited from being displayed for any duration. Other types of dialogue box may be allowed to be inhibited from being displayed, but only for a predetermined duration. In these embodiments, in step U1, when determining that a dialogue box is to be displayed, the controller 14 may also determine, based on parameter of the dialogue box, a dialogue box type or an allowed duration for which display of the dialogue box 22 may be inhibited. Based on the parameter, the controller 14 may determine that the dialogue box 22 must be displayed immediately, i.e. that the dialogue box 22 cannot be inhibited from being displayed, or that display of the dialogue box 22 may be inhibited only for a predetermined duration. If it is determined that the dialogue box 22 must be displayed immediately, the operation may proceed from step U1 directly to step U3. If it is determined that display of the dialogue box 22 can be inhibited only for a predetermined duration, in step U7, in addition to determining if a finger 42 is still proximate to the surface of the touchscreen 10, 12, the controller 14 may also compare a time for which the dialogue box 22 has been inhibited from being displayed with the predetermined duration. If the time for which the dialogue box 22 has been inhibited from being displayed is greater than or equal to the predetermined duration, the operation may proceed directly to step U8.

If in step U8, it is determined that the finger 41 is no longer near to the surface of the touchscreen 10, 12, the operation proceeds to step U8, in which the controller 14 displays the dialogue box 22 at the overlay area 40 in an unmodified manner. FIG. 8C shows the dialogue box 22 being displayed at the overlay area 40 following removal of the user's finger 41.

If, in step U5, it is determined that the finger location 42 does not correspond to the overlay area 40 of the dialogue box 22, the operation proceeds to step U3, in which the dialogue box 22 is displayed at the overlay area 40 of the touchscreen 10, 12.

The exemplary operations described with reference to the examples of FIGS. 7 and 8A to 8C prevent the user from accidently closing a dialogue box 22 when attempting to provide a touch input for a purpose other than to close the dialogue box 22, for example, such as to select an icon from a menu, or to provide a response to, or to shut down, a dialogue box that is already being displayed on the touchscreen 10, 12. This is achieved by inhibiting the display of the dialogue box until after the digit has been removed from near the touchscreen.

Figure 7B:
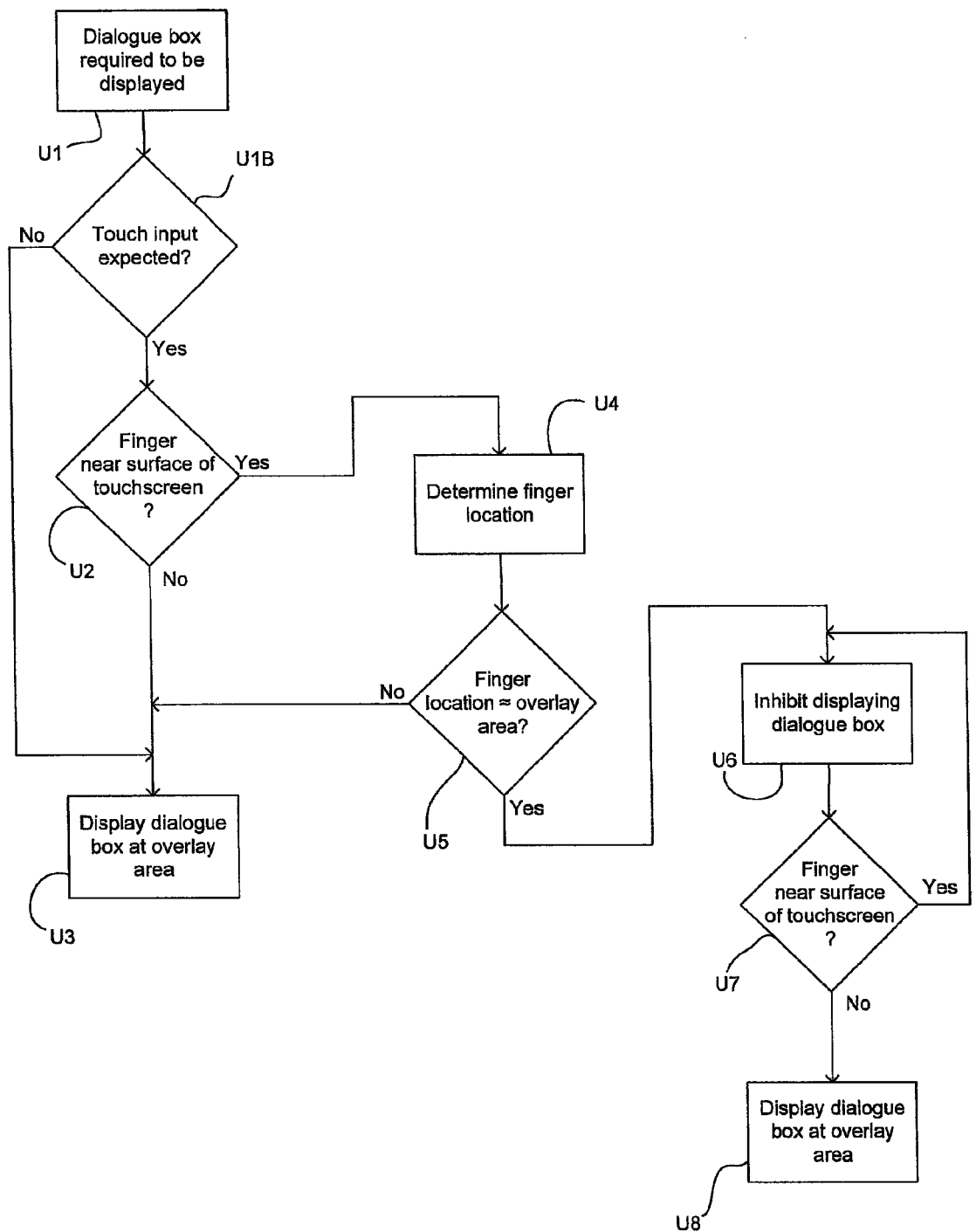
FIG. 7B is a flow chart illustrating an alternative operation according to the third exemplary embodiment of the invention.

According to some alternative exemplary embodiments, the apparatus of FIG. 1 may perform an operation as depicted in FIG. 7B. The exemplary operation of FIG. 7B differs from that in FIG. 7 in that it includes an additional step, U1B, between steps U1 and U2. Step T1B comprises the controller 14 determining whether it is expected that a touch input will be received soon. This may comprise determining, based on applications being executed by the device 2, whether the user is currently performing a task that is not yet completed. The task may include, for example, text or number entry. Thus, if a keyboard or keypad is currently being displayed on the display to allow text or number entry, the controller 14 may determine that another touch input is likely to be received. Other such tasks include, for example, an installation- or other type of wizard being executed on the device. If it is determined in step U1B that a touch input is expected to be received soon, the operation proceeds to step U2. If, instead, it is determined that a touch input is not expected to be received soon, the operation proceeds to step U3.

In each of the above exemplary operations, the behaviour of the dialogue box 22 is modified if it is determined that the user's finger 41 is near to the surface of the touchscreen 10, 12 at a location corresponding to the overlay area 40. It will be understood, however, that the controller 14 determines that the user's finger 41 is near to the surface of the touchscreen 10, 12 also when the finger 41 is actually in contact with the surface of the touchscreen 10, 12, i.e. that 'near' includes touching.

In each of the above examples, the touch input, or near-touch input is provided by a user's finger 41. It will be appreciated, however, that the user may instead use their thumb, a stylus or any other suitable member in order to provide touch inputs to the touchscreen 10, 12.

It will be appreciated that the presence of a finger, thumb or stylus near to the touch sensitive panel 12 may be detected in any suitable way. It will be appreciated also that the touching by a finger, thumb or stylus on the touch sensitive panel 12 may be detected in any suitable way.

It should be realized that the foregoing embodiments should not be construed as limiting. Other variations and modifications will be apparent to persons skilled in the art upon reading the present application. Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method comprising:
   determining that an image is to be displayed at a predetermined area on a touch-sensitive display, an action being performed in response to a user providing a touch input at a predetermined location within the predetermined area;
   responding to the determination that an image is to be displayed at a predetermined area on the touch-sensitive display by detecting whether a digit is proximate to a surface of the touch-sensitive display;
   if a digit is proximate the surface of the touch-sensitive display, determining a digit location, the digit location being a location on the surface of the touch-sensitive display to which the digit is proximate;
   comparing the digit location with the predetermined location; and
   responding to a determination that the digit location corresponds to the predetermined location by modifying an operation of the image so as to prevent the action being performed in response to a user providing a touch input at the predetermined location.

2. The method of claim 1, further comprising:
   determining a second location on the touch-sensitive display, the second location being a location that does not correspond to the digit location, and wherein modifying the operation of the image comprises causing the image to be displayed at the second location.

3. The method of claim 2, further comprising:
   causing the image initially to be displayed at the predetermined location; and
   causing an animation of movement of the image from the predetermined location to the second location to be displayed on the touch-sensitive display.

4. The method of claim 1, wherein modifying the operation of the image comprises inhibiting display of the image and responding to a determination that the digit is not proximate to the surface of the touch-sensitive display by causing the image to be displayed at the predetermined location.

5. The method of claim 1, wherein modifying the operation of the image comprises disabling an operability to perform the action in response to the user providing a touch input at the predetermined location and responding to a determination that the digit is not proximate to the surface of the touch-sensitive display by re-enabling the operability to perform the action in response to the user providing a touch input at the predetermined location.

6. The method of claim 1 further comprising:
   determining whether a touch input is expected to be received;
   in response to determining that a touch input is expected to be received, detecting the presence of the digit, determining the digit location, comparing the digit location with the predetermined location, and if the digit location corresponds to the predetermined location, modifying the operation of the image so as to prevent the action being performed in response to a touch input provided at the predetermined location; and
   in response to determining that a touch input is not expected to be received, causing the image to be displayed at the predetermined area.

7. A non-transitory computer-readable storage medium having stored thereon computer-readable code, which, when executed by computing apparatus, causes the computer apparatus:
   to determine that an image is to be displayed at a predetermined area on a touch-sensitive display, an action being performed in response to a user providing a touch input at a predetermined location within the predetermined area;
   to respond to the determination that an image is to be displayed at the predetermined area on the touch-sensitive display by detecting whether a digit is proximate to a surface of the touch-sensitive display;
   if a digit is proximate the surface of the touch-sensitive display, to determine a digit location, the digit location being a location on the surface of the touch-sensitive display to which the digit is proximate;
   to compare the digit location with the predetermined location; and
   to respond to a determination that the digit location corresponds to the predetermined location by modifying an operation of the image so as to prevent the action being performed in response to a user providing a touch input at the predetermined location.

8. The non-transitory computer-readable storage medium of claim 7, wherein the computer-readable code, when executed by the computing apparatus, causes the apparatus to determine a second location on the touch-sensitive display, the second location being a location that does not correspond to the digit location, and to modify the operation of the image by causing the image to be displayed at the second location.

9. The non-transitory computer-readable storage medium of claim 8, wherein the computer-readable code, when executed by the computing apparatus, causes the apparatus:
   to cause the image to be displayed initially at the predetermined location; and
   to cause an animation of movement of the image from the predetermined location to the second location to be displayed on the touch-sensitive display.

10. The non-transitory computer-readable storage medium of claim 7, wherein the computer-readable code, when executed by the computing apparatus, causes the computing apparatus to inhibit displaying the image and to respond to a determination that that the digit is not proximate to the surface of the touch-sensitive display by causing the image to be displayed at the predetermined location.

11. The non-transitory computer-readable storage medium of claim 7, wherein the computer-readable code, when executed by the computing apparatus, causes the computing apparatus to disable the operability to perform the action in response to the user providing a touch input at the predetermined location and to respond to a determination that the digit is not proximate to the surface of the touch-sensitive display by re-enabling an operability to perform the action in response to the user providing a touch input at the predetermined location.

12. The non-transitory computer-readable storage medium of claim 7, wherein the computer-readable code, when executed by the computing apparatus, causes the computing apparatus:
   to determine whether a touch input is expected to be received;
   in response to determining that a touch input is expected to be received, to detect the presence of the digit, to determine the digit location, to compare the digit location with the predetermined location, and if the digit location corresponds to the predetermined location, to modify the operation of the image so as to the action being performed in response to a touch input provided at the predetermined location; and in response to determining that a touch input is not expected to be received, to cause the image to be displayed at the predetermined area.

13. An apparatus comprising at least one processor configured, under the control of machine-readable code, to cause the apparatus:

to determine that an image is to be displayed at a predetermined area on a touch-sensitive display, an action being performed in response to a user providing a touch input at a predetermined location within the predetermined area;

to respond to the determination that an image is to be displayed at a predetermined area on the touch-sensitive display by detecting whether a digit is proximate to a surface of the touch-sensitive display;

if a digit is proximate the surface of the touch-sensitive display, to determine a digit location, the digit location being a location on the surface of the touch-sensitive display to which the digit is proximate;

to compare the digit location with the predetermined location; and to respond to a determination that the digit location corresponds to the predetermined location by modifying an operation of the image so as to prevent the action being performed in response to a touch input provided at the predetermined location.

14. The apparatus of claim 13, wherein the at least one processor is further configured under the control of machine-readable code, to cause the apparatus to determine a second location on the touch-sensitive display, the second location being a location that does not correspond to the digit location, and to modify the operation of the image by causing the image to be displayed at the second location.

15. The apparatus of claim 14, wherein the at least one processor is further configured, under the control of machine-readable code, to cause the apparatus:

to cause the image initially to be displayed at the predetermined location; and to cause an animation of movement of the image from the predetermined location to the second location to be displayed on the touch-sensitive display.

16. The apparatus of claim 13, wherein the at least one processor is further configured, under the control of machine-readable code, to cause the apparatus to inhibit displaying the image and to respond to a determination that that the digit is not proximate to the surface of the touch-sensitive display by causing the image to be displayed at the predetermined location.

17. The apparatus of claim 13, wherein the at least one processor is further configured, under the control of machine-readable code, to cause the apparatus to disable an operability to perform the action in response to the user providing a touch input at the predetermined location and to respond to a determination that the digit is not proximate to the surface of the touch-sensitive display by re-enabling the operability to perform the action in response to the user providing a touch input at the predetermined location.

18. The apparatus of claim 13, wherein the apparatus is a mobile phone.

19. The apparatus of claim 13, wherein the at least one processor is further configured, under the control of machine-readable code, to cause the apparatus:

to determine whether a touch input is expected to be received;

in response to determining that a touch input is expected to be received, to detect the presence of the digit, to determine a digit location, to compare the digit location with the predetermined location, and if the digit location corresponds to the predetermined location, to modify the operation of the image so as to prevent the action being performed in response to a touch input provided at the predetermined location; and in response to determining that a touch input is not expected to be received, to cause the image to be displayed at the predetermined area.

* * * * *

UNITED STATES PATENT AND TRADEMARK OFFICE
CERTIFICATE OF CORRECTION

PATENT NO. : 8,378,982 B2  
APPLICATION NO. : 12/645999  
DATED : February 19, 2013  
INVENTOR(S) : Teemu Tapani Hautala Page 1 of 1

It is certified that error appears in the above-identified patent and that said Letters Patent is hereby corrected as shown below:

In the Claims:

In Claim 10:
Column 12, line 44, "that that" should be deleted and -- that -- should be inserted.

In Claim 12:
Column 13, line 1, "to the" should be deleted and -- to prevent the -- should be inserted.

In Claim 16:
Column 14, line 9, "that that" should be deleted and -- that -- should be inserted.

Signed and Sealed this  
Sixteenth Day of July, 2013

Teresa Stanek Rea  
*Acting Director of the United States Patent and Trademark Office*